United States Patent [19]

Kanda et al.

[11] Patent Number: 4,577,504
[45] Date of Patent: Mar. 25, 1986

[54] ACOUSTIC MICROSCOPE

[75] Inventors: Hiroshi Kanda, Tokorozawa; Isao Ishikawa, Hino, both of Japan

[73] Assignee: Hitachi, Ltd., Tokyo, Japan

[21] Appl. No.: 601,960

[22] Filed: Apr. 19, 1984

[30] Foreign Application Priority Data

Apr. 22, 1983 [JP] Japan .................................. 58-69956

[51] Int. Cl.$^4$ ........................................... G01N 29/00
[52] U.S. Cl. ..................................................... 73/606
[58] Field of Search ................. 73/606, 607, 599, 609, 73/615, 629, 631

[56] References Cited

U.S. PATENT DOCUMENTS 3,482,434 12/1969 de Gowan et al. .................... 73/609
3,548,641 12/1970 Mitchell ................................ 73/609
4,386,530 6/1983 Kanda et al. ......................... 73/615

Primary Examiner—Stephen A. Kreitman
Attorney, Agent, or Firm—Antonelli, Terry & Wands

[57] ABSTRACT

An acoustic microscope of the type of mechanical scanning in which a single transducer works to generate an acoustic beam as well as to detect echoes reflected from the specimen. An echo reflected from an interface between an acoustic lens and an acoustic propagation medium is detected, and the detected intensity is used as a reference to display the distribution of attenuation factors of the specimen in a two-dimensional manner. Among the signals representing the distribution of attenuation factors of the specimen, furthermore, only those signals having intensities that lie within a predetermined range are displayed to obtain a picture of the specimen that represents the distribution of attenuation factors of a predetermined range only.

2 Claims, 11 Drawing Figures

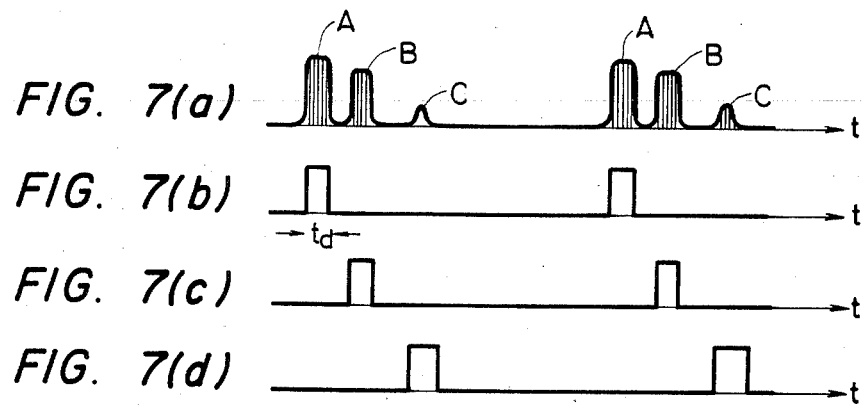
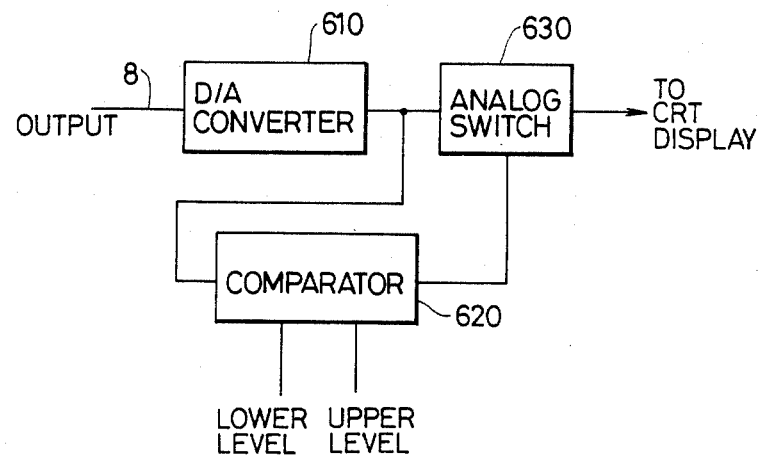

ACOUSTIC MICROSCOPE

BACKGROUND OF THE INVENTION

The present invention relates to an imaging device which works utilizing acoustic energy, and particularly to an acoustic microscope.

In recent years, attention has been given in the medical world to ultrasonic waves that can be effectively utilized for observing the internal structure of human bodies. Namely, ultrasonic waves have a property to penetrate through materials that may be optically opaque to light or electron rays. The higher the frequency, the more finely the objects can be described. Furthermore, the data obtained with ultrasonic waves reflect dynamic properties of the objects, such as elasticity, density, viscosity, and the like, and make it possible to learn the internal structure that could not be obtained with light or electron rays.

Study has been forwarded concerning the acoustic microscope which makes the most of ultrasonic waves by utilizing ultra-high frequency sound waves of as high as 1 GHz, i.e., having a sound wavelength of about 1 $\mu$m in the water (literature entitled "A Scanning Acoustic Microscope" by R. A. (Lemons) and C. F. (Quate), IEEE Cat. No. 73 CH 14829 SU, pp. 423-426).

The principle of an acoustic microscope consists of mechanically scanning the surface of a specimen in a two-dimensional manner with an acoustic beam which is focused to as narrow as about 1 $\mu$m, collecting the disturbed sound waves such as those scattered and reflected by the specimen or those attenuated as they travel through the specimen, converting the collected sound waves into electric signals, and displaying the electric signals on a cathode-ray tube in a two-dimensional manner in synchronism with the mechanical scanning, thereby to obtain a microscope image.

If the sound waves which have transmitted through the specimen are detected and displayed on the acoustic microscope, the obtained image reflects the distribution of acoustic attenuation constant (hereinafter simply referred to as attenuation constant) of the specimen. In the practically used apparatus, the intensity of RF pulses for oscillating the sound waves is fixed, and the amplification factor of an amplifier which amplifies sound wave detection signals is suitably adjusted such that the image is displayed on the cathode-ray tube with a suitable brightness. According to the conventional apparatus, therefore, there exists no definite relation between the attenuation constants of the specimen and the brightness of signal on the cathode-ray tube. Namely, it is not allowed to use density informations of the obtained sound wave image as measured data of attenuation constant of the specimen.

If mentioned in further detail, even if the amplification factor of the amplifier is displayed, it is difficult to correctly measure the attenuation constant of the specimen. This is because, the transmitting efficiency of a transducer which generates sound waves varies depending upon the frequency. Besides, even if a fixed frequency is used, the abovementioned efficiency varies with aging. Accordingly, to presume the intensity of sound waves incident upon the specimen relying upon the intensity of RF pulses, involves incorrect factors. Another reason is that the sensitivity of a receiving transducer for detecting sound waves that have transmitted through the specimen, also varies depending upon the frequency and aging. Therefore, to presume the intensity of sound waves that have transmitted through the specimen relying the amplification factor of an amplifier which amplifies detection signals or relying upon the brightness of a picture on the cathode-ray tube, also involves incorrect factors.

The present invention deals with an acoustic microscope of the reflection type which obtains a picture that reflects the distribution of attenuation factors of a specimen by detecting echoes reflected from the back surface of the specimen. The acoustic microscope of this type has been disclosed in Japanese Patent Application No. 35828/ 1983 filed on March 7, 1983 that is earlier than the filing date of the present application.

SUMMARY OF THE INVENTION

An object of the present invention is to provide an acoustic microscope which is capable of displaying an attenuation constant inherent in a specimen at all times without being affected by the operating conditions.

Another object of the present invention is to provide an acoustic microscope which is capable of producing a display with good contrast by converting the change in two-dimensional distribution of an attenuation constant into an natural scale.

A further object of the present is to provide an acoustic microscope which is capable of displaying, in a sliced manner, only arbitrary selected ranges of attenuation constants depending upon the distribution of attenuation constants of a specimen being observed, so that the picture can be produced with clear and increased contrast.

A feature of the present invention resides in that an echo reflected from an interface between a lens and an acoustic propagation medium, that had hitherto been regarded as useless, is used as a reference signal, and a detection signal of the echo reflected from the back surface of the specimen is compared with the above reference signal, to display attenuation constants of the specimen. Like the intensity of echo from the specimen, the intensity of the echo from the interface of the lens varies depending upon the intensity of RF pulses that are applied, transmitting/receiving sensitivity of the transducer, and gain of the receive amplifier. However, the ratio of these two echoes intensity remains constant irrespective of these quantities. Relying upon the above fact, attenuation constants of the specimen can be displayed definitly without being affected by these quantities.

Another feature of the present invention resides in the provision of a level selection circuit which introduces receiving signals from an acoustic transducer that displays a two-dimensional distribution of attenuation constants of the specimen, which permits said receiving signals to pass through only when they have intensities that lie within a predetermined range, and which inhibits the passage of said receiving signals when they have intensities that lie outside said range.

BRIEF DESCRIPTION OF THE DRAWINGS

FIG. 7(a)-(d) is a time chart showing the operation of FIG. 6; and

FIG. 8 is a circuit diagram of a block 600 of FIG. 6.

DETAILED DESCRIPTION

Figure 1:
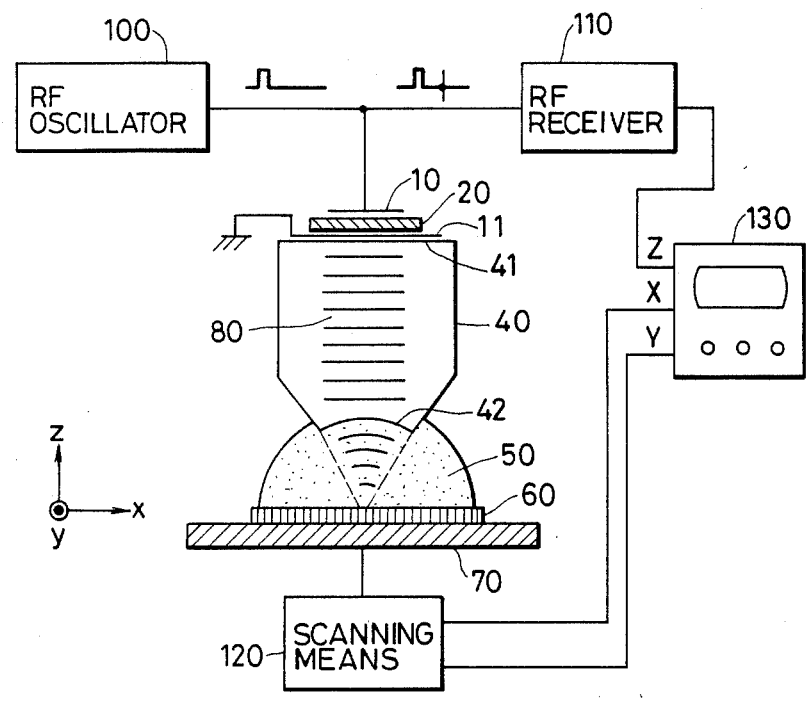
FIG. 1 is a diagram which schematically illustrates the setup of a conventional acoustic microscope.

Prior to describing an embodiment of the present invention, the fundamental setup of an acoustic microscope of the reflection type to which the present invention will be adapted, is described below with reference to FIG. 1.

A transducer which generates and detects ultrasonic waves consists chiefly of a piezoelectric thin film 20 and an acoustic lens 40. That is, a lens crystal 40 (e.g., a cylindrical crystal of sapphire, quartz glass or the like) has a flat surface at its one end 41 that is optically polished, and a semispherical hole 42 of a very small radius of curvature (for example, 0.1 to 1 mm) at the other end. If electric signals produced by an RF pulse generator 100 are applied across the upper and lower electrodes constructed in the form of layers consisting of an upper electrode 10, piezoelectric thin film 20 and lower electrode 11, which are metallized on the end surface 41, plane ultrasonic waves 80 of RF pulses are emitted into the lens crystal 40 due to the piezoelectric effect of the piezoelectric thin film. The plane acoustic waves are focused on a specimen 60 placed on the surface of a predetermined focal point owing to a positive acoustic spherical lens formed by the interface between the semispherical hole 42 and a medium 50 (which usually is pure water).

The ultrasonic waves reflected by the specimen 60 are collected by the acoustic lens, converted into plane ultrasonic waves, propagate through the lens crystal 40, and are finally converted into RF pulse electric signals due to the inverse piezoelectric effect of the piezoelectric thin film. These RF pulse electric signals are amplified and detected by an RF receiver 110, converted into video signals (1 to 10 MHz), and are used as brightness signals (Z inputs) for the cathode-ray tube 130.

In the above-mentioned construction, the specimen 60 stuck onto the specimen stage 70 is two-dimensionally vibrated by a two-dimensional scanning means 120 on the x-y plane, and the video signals are displayed on the cathode-ray tube 130 in synchronism with the scanning thereof. A microscopic picture is thus obtained.

Figure 2:
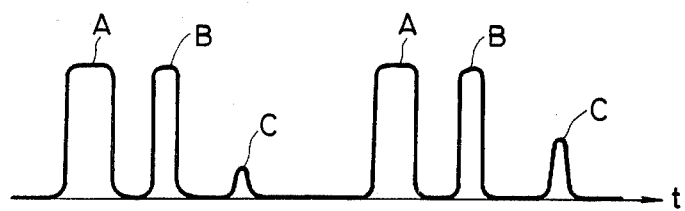
FIG. 2 is a diagram which illustrates the operation thereof.

FIG. 2 illustrates this condition in terms of video frequency regions, in which the abscissa represents the time, and the ordinate represents the intensity of signals. In FIG. 2, symbol A denotes a signal passed through the transmitter, B denotes an echo from the lens interface 42, and C denotes an echo reflected by the specimen. They are repeated at a repeating time $t_R$, to constitute every picture element. The reflected echo C changes depending upon the acoustic properties of the specimen or scanning of the specimen. Therefore, if the intensity of the reflected echo C is sampled in synchronism with the repetitive period, and the signals are displayed on the cathode-ray tube in synchronism with the mechanical scanning of the specimen, then an acoustic image is obtained.

Figure 3:
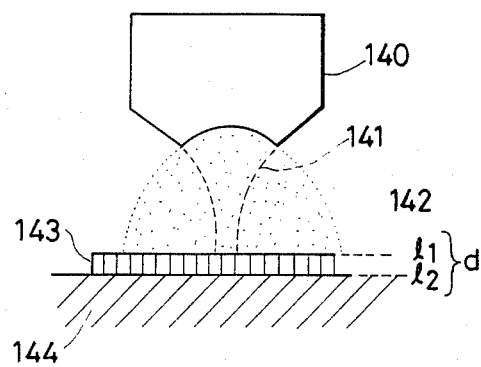
FIG. 3 is a diagram which illustrates the mechanism of reflection.

Here, when a piece of tissue of a living thing is observed relying upon the setup which is shown in FIG. 3, the intensity of the reflected echo C serves as the data that reflects an attenuation constant of a specimen of the living thing. In FIG. 3, the specimen 143 of living thing is backed with a specimen plate 144 which is composed of a glass or a metal having an acoustic impedance which is greater than an acoustic impedance of the specimen. If the upper surface of the specimen 143 of living thing is denoted by $l_1$, the lower surface thereof is denoted by $l_2$, and the thickness thereof is denoted by d, the ultrasonic wave beam 141 which is incident upon the specimen from the upper direction is, first, partly reflected by the interface $l_1$. However, most of the beam 141 is transmitted into the specimen 143. Here, the amount of reflection is very small since the acoustic impedance of the specimen 143 of a living thing is close to the acoustic impedance of the medium 142. The sound waves which have propagated through the specimen 143 are reflected by the interface $l_2$, propagate through the specimen upwardly in the drawing, enter into the water 142 via the interface $l_1$, and are detected by a probe system 140 as reflected sound waves. If the backing material 144 has an acoustic impedance which is sufficiently greater than that of the specimen of the living thing, it can be regarded that the sound waves are completely reflected by the interface $l_2$. With the setup shown in FIG. 3, it can be said that the reflected signals are virtually determined by the signals reflected by the interface $l_2$.

If acoustic impedances of the specimen of living thing, water and backing material are denoted by $Z_S$, $Z_W$, $Z_B$, respectively, a reflection constant R is given by, $$R = \frac{(Z_S - Z_W)(Z_S + Z_B) + (Z_S + Z_W)(Z_B - Z_S)e^{-j\theta}}{(Z_S + Z_W)(Z_S + Z_B) + (Z_S - Z_W)(Z_B - Z_S)e^{-j\theta}} \quad (1)$$

where $\theta = 2(k - j\alpha_S)d$, and k denotes a wave number.

Therefore, since $Z_B > Z_S$, $Z_W$ and $Z_S = Z_W + \Delta Z$, and $\Delta Z/Z_W < 1$, the reflection constant R is given by, $$R = 2^{-2\alpha_S d} \quad (2)$$

where $\alpha_S$ denotes an attenuation constant of the specimen.

That is, with the above-mentioned setup, the reflected signal is equivalent to a transmission signal which has propagated through the specimen of the living thing twice. Therefore, excellent contrast is obtained owing to a relation of square power, to reflect the attenuation constant $\alpha_S$ of the specimen.

So far, the electric signals (reflected ultrasonic waves) proportional to the reflection factor R had been displayed in the form of brightness on the cathode-ray tube. The above-mentioned situation, however, indicates the fact that the attenuation factors of the specimen, or the two-dimensional distribution of physical quantities inherent in the specimen, can be found by examining the intensity of the reflected echoes C. Based upon this viewpoint, the inventors of the present invention have found that there exists substantial difficulty if the intensity of reflection is simply displayed in the form of brightness in a customary manner. First, the conventional method of processing the echoes C will be described below.

Figure 4:
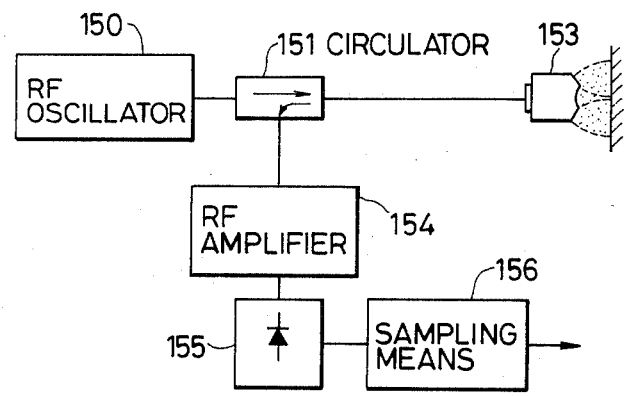
FIG. 4 is a block diagram which illustrates a method of processing the reflected waves.

With reference to FIG. 4, an output pulse (intensity E) produced by an RF pulse oscillator 150 is applied, via a directional coupler 151, to a transducer 153 which consists of a lens and a piezoelectric thin film. The RF electric signal containing an ultrasonic wave signal (such as the one shown in FIG. 2) reflected by the specimen passes through the directional coupler 151, amplified through a variable RF amplifier 154 (having an amplification degree G), detected by a diode in a video detector 155 (the waveform in FIG. 2 corresponds to the waveform of this output), taken out by a sampling circuit 156 in the form of the intensity of echo C only, and is used as a brightness signal for the cathode-ray tube.

According to the conventional method, as described above, the intensity E of the applied RF pulses is fixed, and the gain of the amplifier 154 is manually adjusted such that the intensity of the reflected echo C will assume a level to suitably brighten the cathode-ray tube.

In the conventional method, therefore, there is no definite relation between the attenuation constants of the specimen and the brightness signals on the cathode-ray tube, and it is not allowed to use displayed data of the obtained sound wave image as measured data.

According to the present invention, on the other hand, use is made, as a reference signal, of an echo B reflected from the interface of a lens and a medium, that had hitherto been regarded as useless. Like the intensity of echo C from the specimen, the intensity of echo B from the interface of lens also varies in proportion to the above-mentioned three quantities, i.e., varies in proportion to the intensity E of the applied RF pulses, transmitting/receiving sensitivity T of the transucer, and gain G of the variable amplifier. It was, however, discovered that the ratio of these two echoes remains constant irrespective of these quantities.

Figure 5:
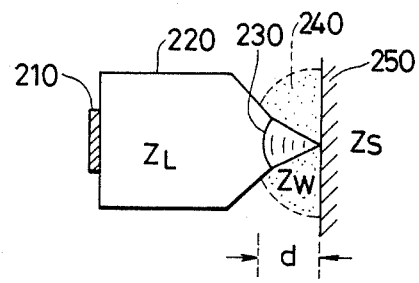
FIG. 5 is a diagram for calculating intensities of echoes from the interface of lens and from the specimen.

This situation will be qualitatively described below with reference to FIG. 5. In FIG. 5, the echo B from the interface of lens is provided by a phenomenon in which an ultrasonic wave pulse generated in the lens 220 by a piezoelectric thin film 210 is reflected by the interface 230 of lens. Therefore, the intensity $V_B$ of echo B is given by, $$V_B = ETG \frac{Z_W - Z_L}{Z_W + Z_L} \quad (3)$$

where $Z_L$ denotes an acoustic impedance of the lens.

Here, $(Z_W-Z_L)(Z_W+Z_L)$ represents a reflection factor of the interface of the lens.

With regard to the echo C reflected by the specimen, on the other hand, the ultrasonic wave pulse which has reached the interface 230 of lens further propagates through the medium 240 while being attenuated, reflected by the specimen 250, and is collected again by the lens. Therefore, the intensity $V_C$ of echo C is given by, $$V_C = ETG \frac{4Z_L Z_W}{(Z_L + Z_W)^2} e^{-2\alpha_w d} \cdot R \quad (4)$$

where $\alpha_W$ denotes an attenuation factor per unit propagation distance in the medium, and d denotes a distance between the lens and the specimen. Here, the term $4Z_L Z_W/(Z_L+Z_W)^2$ denotes a transmission factor of when the echo passes through the interface of lens twice, and $e^{-2\alpha wd}$ denotes an attenuation factor for the echo that reciprocates by 2d in the medium.

Therefore, if the intensity of echo B from the interface of lens is based upon as a reference, then the intensity of echo C reflected by the specimen is given by a ratio, $$\frac{V_C}{V_B} = \frac{4Z_L Z_W}{(Z_L + Z_W)(Z_W - Z_L)} e^{-2\alpha_w d} \cdot R \quad (5)$$

Thus, it is possible to set an absolute level for the reflected echo C irrespective of the abovementioned three variable quantities E, T, G.

Even when the quantities E, T and G are changed to obtain an optimum picture, therefore, the quantity of reflected echo C, i.e., the intensity of reflected echo C, remains unchanged with the intensity of echo B from the interface of lens as a reference. Namely, even when the gain is so set as will be adapted for observing the picture, the two-dimensional distribution of attenuation constant of the specimen can be measured independently and qualitatively.

In the embodiment of the present invention that will be described later, a novel technique is employed; i.e., among the signals of various attenuation factors of the specimen obtained as described above, signals having attenuation factors that lie within a predetermined range only are displayed on the cathode-ray tube to describe the picture. For instance, when a specimen of a living thing is observed, the attenuation constant may be about −20 to −30 dB for the connective tissue, and may be about −40 to −60 dB for a cancered region of tissue. Thus, the magnitudes of attenuation constant are localized depending upon the object to be observed. Therefore, if the distribution of attenuation constant that lies within a predetermined range only is taken out and displayed, the picture can be displayed with more clear contrast based upon the two-dimensional distribution of attenuation constants. For this purpose, the attenuation factors of degrees that lie within a given range (e.g., from −20 dB to −30 dB) only need be displayed. Here, this range should be allowed to be changed arbitrarily.

Figure 6:
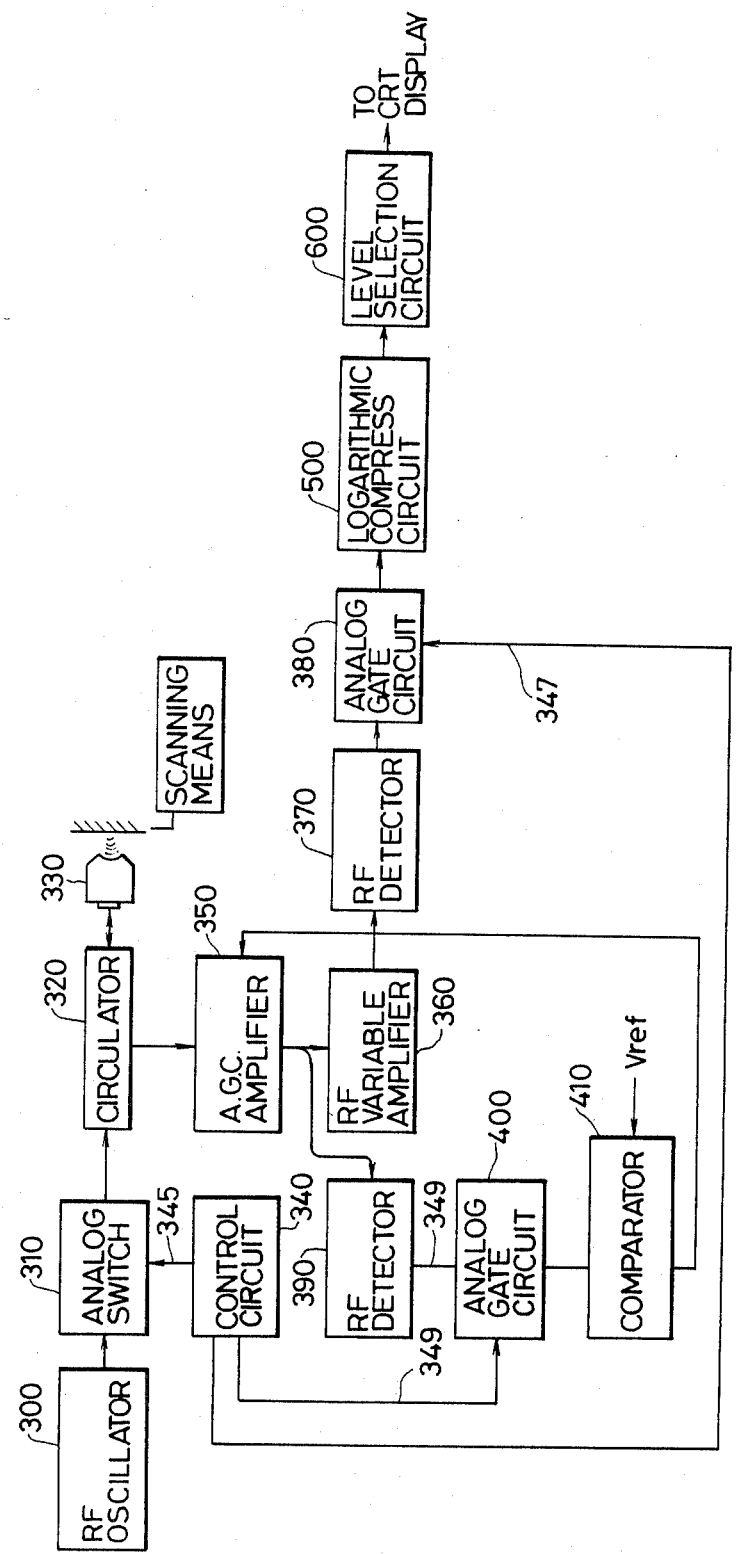
FIG. 6 is a block diagram showing an embodiment of the present invention.

An embodiment of the present invention will now be described below with reference to FIG. 6 and FIG. 7 which is a time chart illustrating the operation of the embodiment.

An RF continuous wave oscillator 300 produces RF continuous wave electric signals of a frequency of, for example, 1 GHz. An analog switch 310 is controlled by a control signal 345 (shown in FIG. 7(b)) from a control circuit 340. An RF signal which has passed through the analog switch 310 is transformed into an RF pulse signal of a duration time $t_d$ (for example, 100 ns), and is applied to a transducer 330 via a directional coupler 320. The transducer 330 is the same as the transducer of FIG. 1. A reflection detection signal obtained from the transducer passes through the directional coupler 320, amplified through an AGC amplifier 350 and an RF variable amplifier 360, converted into a video signal (band of up to 10 MHz) through an RF detector 370, and is applied to an analog gate circuit 380 which extracts only an echo C reflected by the specimen among the reflected echoes A, B and C shown in FIG. 7(a) responsive to a control signal 347 shown in FIG. 7(d), thereby to form a sampling signal of attenuation factor of the specimen.

The output of the AGC amplifier 350 (waveform of FIG. 7(a)) is converted on a video band through an RF detector 390, and is applied to an analog gate circuit 400 which extracts the echo B reflected from the interface of lens responsive to a control signal 349 shown in FIG. 7(c) and supplies it to one input terminal of a comparator 410. The comparator 410 detects a difference between a voltage of the reflected echo B and a preset reference voltage Vref. An AGC loop has been formed to control the gain of the AGC amplifier 350, so that the output of the comparator 410 will become zero.

According to the above-mentioned setup, the gain of the AGC amplifier 350 (the gain of the AGC amplifier at this moment is denoted by Go) is so adjusted that the intensity of echo B from the interface of the lens is brought into agreement with a preset reference voltage, irrespective of the intensity E of the applied RF pulses or the transmitting/receiving sensitivity T of the transducer. Therefore, the echo reflected by the specimen is automatically amplified by Go times. By utilizing the amplification factor $G_1$ of the variable amplifier 360, therefore, the data resulting from attenuation factors only can be taken out of the data carried by the echoes reflected by the specimen, based upon a relation.

$$V_C = G_1 \cdot V_B \quad (6)$$

with the intensity of echo B from the interface of the lens as a reference. According to this embodiment, the attenuation factor sampling output is applied to a level selector circuit 600 via a logarithmic compress circuit 500, and the output thereof is used as a brightness signal for the cathode-ray tube.

FIG. 8 shows an embodiment of the level selector circuit, in which an output of digital quantity (consisting, for example, of 8 bits) indicating the attenuation factor is converted into an analog signal through a DA converter 610, and is used as a brightness signal for the cathode-ray tube via an analog switch 630. The analog signal is input to a window comparator 620. When the analog signal has an amplitude that lies between a lower limit level $x_1$ and an upper limit level $x_2$ of attenuation factor designated by the operator, the analog switch 630 permits the passage of output of the comparator 620. Then, the signals within a range $x = x_1$ to $x_2$ are directly displayed on the cathode-ray tube. Other signals, however, are not permitted to pass through the analog switch 630, and are not displayed. The function of level selection is thus produced.

Although an analog comparator was used as a level selector circuit in this embodiment, it is also allowable to control the arithmetic operation in a digital manner by using a microcomputer.

Finally, to calibrate 0 dB which is an absolute value for the attenuation factor, the apparatus should be calibrated based upon the signals reflected by a mirror that serves as backing material when there is no specimen of a living thing.

We claim:

1. An acoustic microscope comprising:
    an acoustic transducer which has a piezoelectric element and an acoustic lens;
    a specimen holding means which holds a specimen in a manner to be opposed to said transducer via an acoustic propagation medium, the back surface of said specimen holding means being lined with a reflective material;
    a drive means which drives said transducer in a pulse-like manner responsive to electric signals;
    a receiving means which amplifies and detects reflected echoes that are detected by said transducer;
    an AGC circuit means which samples an echo reflected from an interface between said acoustic lens and said acoustic propagation medium among said reflected echoes, and which controls the amplification factor of said receiving means such that the output thereof will reach a predetermined value;
    a sampling means which samples an echo reflected from said specimen among said reflected echoes; and
    a display means which displays the echo sampled by said sampling means.

2. An acoustic microscope according to claim 1, wherein said receiving means includes an amplifier for amplifying signals from said acoustic transducer, and a first RF detector for converting signals from said amplifier into first video band signals for application to said sampling means; and said AGC circuit means includes a second RF detector for converting signals from said amplifier into second video band signals, another sampling means for sampling the echo reflected from the interface between said acoustic lens and said acoustic propagation medium among said second video band signals, a comparator for detecting a voltage difference between an output of said another sampling means and a reference voltage, and feedback means for controlling the amplification factor of said amplifier such that the voltage difference detected by said comparator becomes zero.

* * * * *